United States Patent [19]

Komatsu et al.

[11] 4,213,228
[45] Jul. 22, 1980

[54] DEVICE FOR CUTTING OFF THE NECK MEAT OF A FOWL

[75] Inventors: Seigi Komatsu; Hiroshi Kitajima, both of Kobe, Japan

[73] Assignee: Seigi Komatsu, Japan

[21] Appl. No.: 956,802

[22] Filed: Nov. 1, 1978

[51] Int. Cl.² .............................................. A22C 21/00
[52] U.S. Cl. ............................................ 17/11; 99/589; 83/177; 83/733; 17/21
[58] Field of Search .......................... 17/11, 21, 50, 62; 99/587, 588, 589; 83/177, 152, 100, 733

[56] References Cited

U.S. PATENT DOCUMENTS

| | | | |
|---|---|---|---|
| 1,975,044 | 9/1934 | Kelly | 99/589 |
| 3,028,742 | 4/1962 | Hacker et al. | 99/589 X |
| 3,659,639 | 5/1972 | Lindstrom | 99/589 |
| 3,946,629 | 3/1976 | Achelpohl | 83/152 X |
| 4,010,515 | 3/1977 | Koyama | 17/21 |

*Primary Examiner*—Willie G. Abercrombie
*Attorney, Agent, or Firm*—McCormick, Paulding & Huber

[57] ABSTRACT

A device for cutting off the neck meat of a fowl in which the neck of the fowl is held on a support equipped with a suction hole for attracting the meat and the meat is cut by a blade disposed movably to face said suction holes of said support. Said cutting blade is a straight member and is allowed to reciprocate along the length of the suction hole.

6 Claims, 6 Drawing Figures

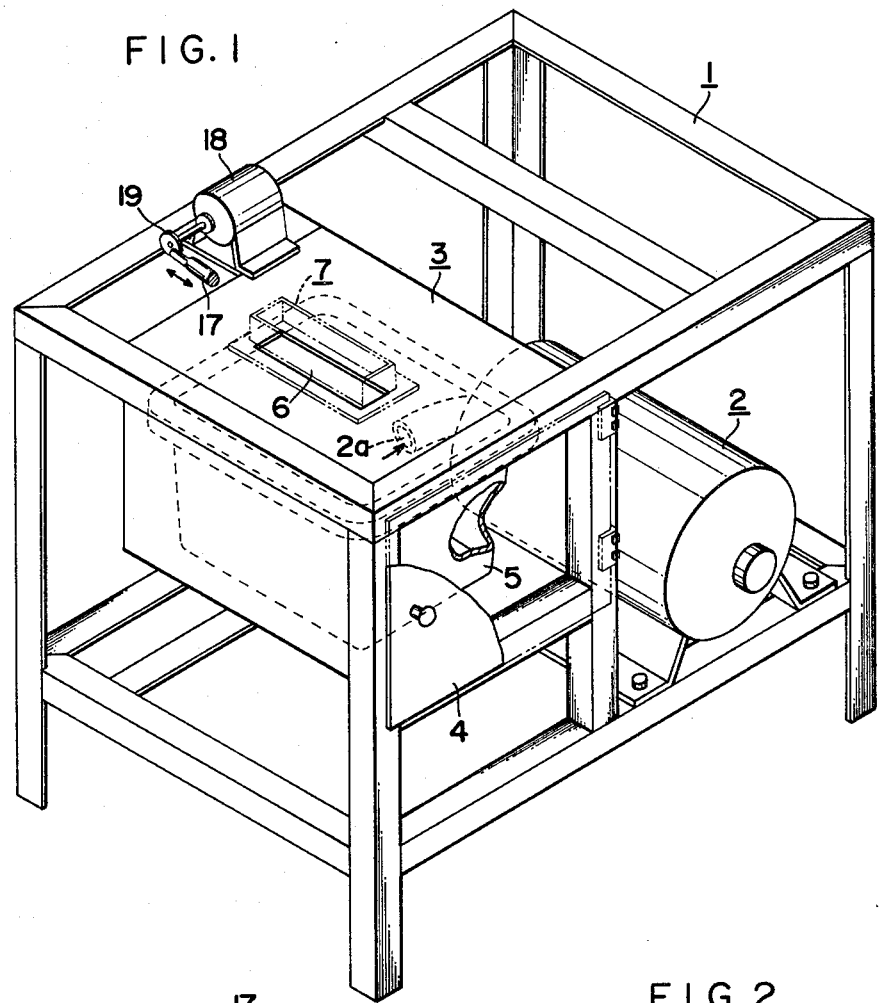
FIG. I
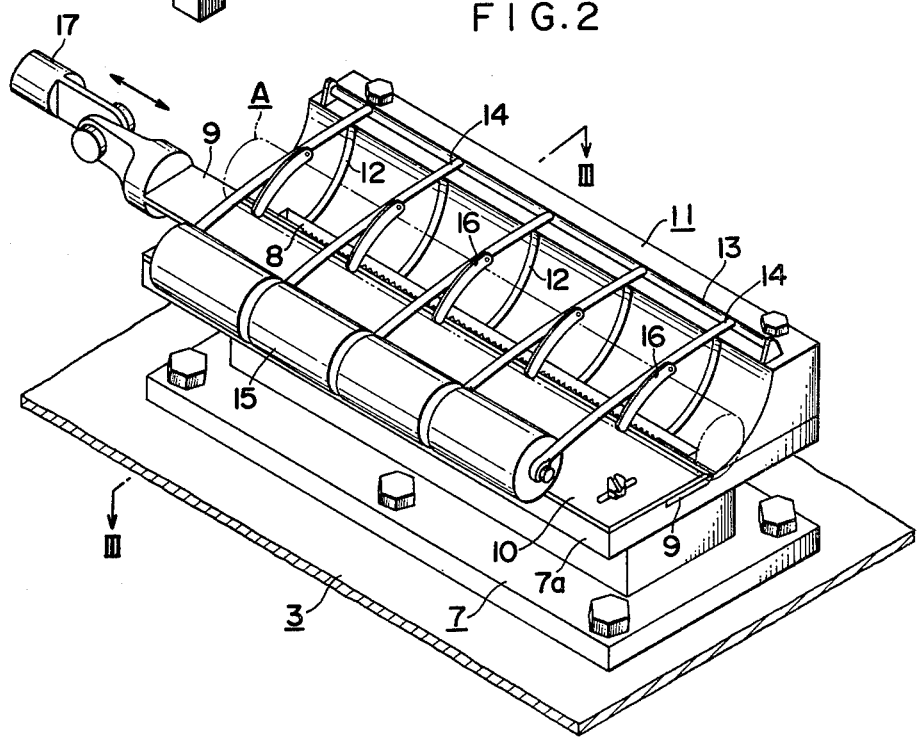
FIG. 2

DEVICE FOR CUTTING OFF THE NECK MEAT OF A FOWL

This invention relates to a device for cutting off the neck meat of a fowl.

Though the neck meat of a fowl is delicious, it is difficult to cut off the neck meat from the neck bone because the neck of a fowl moves constantly and is elongated. Accordingly, it is a customary practise to cut off the neck meat of a fowl from the neck bone manually by the use of a knife and the like. In comparison with the time required for the cut-off work, a large amount of the neck meat can not be obtained. It is an earnest desire by those concerned in the art, therefore, to mechanize this cut-off work. However, if the cut-off work is mechanized in an easy way, the neck meat so obtained is mostly a chopped meat having a low commercial value and such an attempt sometimes results in the mechanical cut-off not only of the neck meat but also of the neck bone. In such a case, fragments of the neck bone admix in the neck meat and reduce remarkably the commercial value of the resulting meat.

The present invention is directed to solve these problems and to enable cutting off the meat of the neck of a fowl rapidly in a large amount by attracting the neck of the fowl onto the support surface of a support equipped with suction holes and cutting off the meat by a cutting blade disposed movably at the attracting section.

In accordance with the present invention, the neck of a fowl is attracted to the suction hole of a support to pull its meat away from the neck bone and the meat is cut off by a moving cutting blade while the neck of the fowl is being rotated. It is therefore possible to rapidly cut off a great amount of meat. Since the support is disposed turnably, the cut-off work can be carried out advantageously without rotating manually the neck of the fowl. Since the cutting blade is allowed to reciprocate as a straight member, it is possible to cut off continuously the neck meat in a larger width, and the resulting meat has an improved commercial value unlike the conventional chopped waste meat. As the edge of the cutting blade is positioned substantially at the center of the suction hole, the meat is tightly pushed to the edge of the cutting blade, thereby enhancing the cutting effect of the cutting blade.

A support blade is disposed above the cutting blade in such a manner that the edge thereof is positioned considerably rearwardly with respect to the edge of the cutting blade. This arrangement prevents the cutting blade from cutting off the neck bone. Hence, the meat thus cut off is free from admixture of the fragments of the neck bone. Thus, in addition to the abovementioned shape of the meat, this also enhances the commercial value of the meat to a marked extent.

The device of the present invention further includes arms capable of opening and closing and pressing the neck of a fowl to the abovementioned support, a clutch for a drive mechanism operating interruptedly in synchronism with the opening and closing actions of the arms and an opening/closing mechanism that opens and closes the suction hole in synchronism with the opening and closing actions of the arms. It is therefore possible to connect a plurality of the present devices to the same suction source so that while one of the devices is in operation, the fowl to be processed is fitted to a fowl fitting body of the rest to thereby speed up the cut-off work.

The fowl fitting body is disposed close to the support and is driven for rotation by a drive mechanism. Hence, the work load to an operator becomes light and the fowl to be processed can be turned at a low constant speed, thereby minimizing the cut-in quantity of the cutting blade. Hence, the cutting effect can be improved to such an extent that the outer circumference of the neck of the fowl can be cut off into a single meat.

Other objects and features of the present invention will become more apparent from the following detailed description taken in conjunction with the accompanying drawings.

FIG. 1 is a perspective view showing the first embodiment of the present invention and FIG. 2 is a perspective view of its principal portion.

Figure 3:
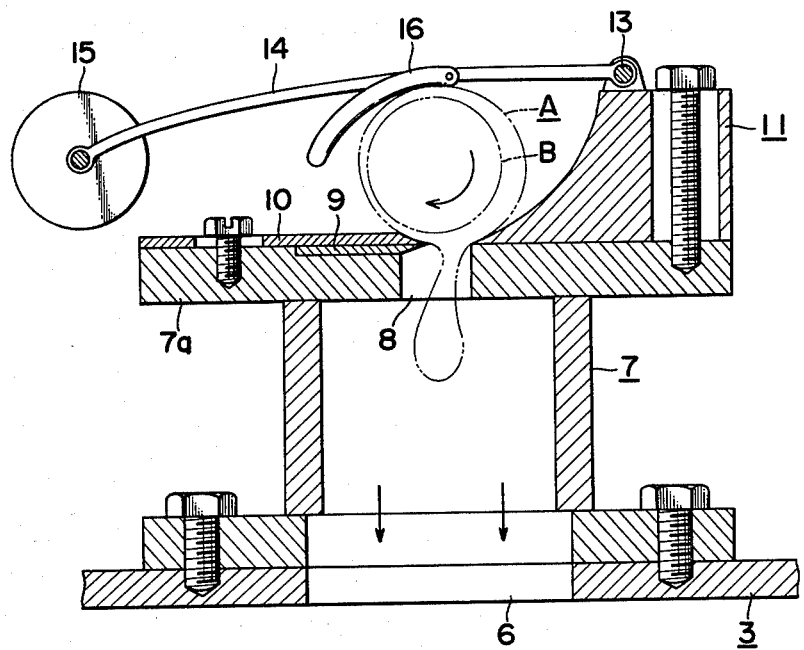
FIG. 3 is a sectional view taken along line III—III of FIG. 2.

The first embodiment of the present invention will now be explained by referring to FIGS. 1 through 3.

A machine frame 1 is first assembled using angle steels and the like, and a suction blower 2 incorporating therein a motor and windmill vanes is placed inside the machine frame. A vacuum box 3 is also placed inside the machine frame and is brought under vacuum when the internal air is sucked by the blower 2 from a hole 2a. A meat receiving box 5 is put into the box 3 and is able to be inserted into and withdrawn from the box via its door 4. A hollow support 7 is communicated with an opening 6 on the upper surface of the box 3. An elongated suction hole 8 is bored in the longitudinal direction on a support plate 7a disposed at the upper end of this support 7 and a groove is formed on the support surface of the support plate 7a in the longitudinal direction along this suction hole 8. A straight tooth saw blade 9 as a cutting blade is fitted reciprocatingly into this groove. The tip or cutting edge of the blade 9 is positioned substantially at the center of the suction hole 8 and is supported by a support blade 10 which is adjustably secured onto the support plate 7a. The edge of the support blade 10 is deviated rearwardly by about 0.5–1 mm with respect to that of the blade 9. A substantially trapezoidal receiving table 11 is secured onto the upper surface of the support plate 7a in such a manner that it opposes these blades 9 and 10 and its fitting position is adjustable. On the inner side surface (the lefthand side surface in FIG. 3) of this receiving table 11 are formed inwardly a plurality of air intake grooves 12 with a predetermined gap between them as shown in FIG. 2. A weight 15 is supported by plural arms 14 via a hinge member 13 on the upper surface of the receiving table 11 and is allowed to rotate. A neck support 16 for supporting the neck A of a fowl is secured by welding to each of these arms 14.

The abovementioned cutting blade 9 is coupled to one end of a rod 17 by means of a pin and the other end of this rod 17 is eccentrically coupled to a disc 19 which is rotated by a motor 18, thereby forming a crank mechanism. Since the support blade 10 and the receiving table 11 are movably adjustable, they can be readjusted to the optimum position in accordance with a varying size of the fowl.

Next, the explanation will be given on the action of this first embodiment.

The blower 2 is first actuated to suck the air into the box 3 through the suction hole 8 and the motor 18 is then driven so as to reciprocate the cutter blade 9. Next, the neck A of the fowl from which the feather is plucked and the skin is stripped off is placed above the suction hole 8 and pressed toward the cutter blade 9 by means of the arms 14 and the support 16. The neck A is then turned clockwise manually in FIG. 3 whereby only the meat of the neck A which is sucked inwardly to the suction hole 8 is continuously cut off from the neck bone B as if it were rewound and then falls into the box 5.

In this instance, deep having of the cutter blade 9 is prevented by the support blade 10 because it functions as a back shave of a two-end shave. Hence, the cutter blade 9 does not cut off the neck bone B.

Figure 4:
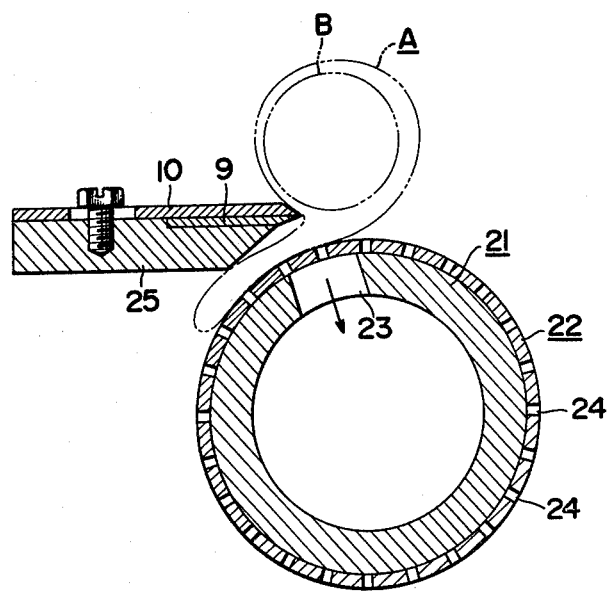
FIG. 4 is a sectional view of the principal portion of the second embodiment of the present invention.

The second embodiment of the present invention will now be explained with reference to FIG. 4 in which like reference numerals are used to identify like constituent elements as in the first embodiment.

A cylindrical support member 22 is turnably fitted to a vacuum pipe 21 which is connected to the suction blower and positioned horizontally. A hole 23 is bored substantially above the vacuum pipe 21 to extend in the axial direction, and some of numerous suction holes 24 formed on the cylindrical portion of the support member 22 are caused to face and communicated with this hole 23.

The cutter blade 9 and the support blade 10 are juxtaposed with the support member 22 above the holes 23 with a proper gap between them and the support member 22. In this embodiment, the lefthand half of the support plate 7a of the first embodiment may be used as a member 25 for supporting the abovementioned blades 9 and 10. The support member 22 of this embodiment corresponds to the support plate 7a of the first embodiment in that the cylindrical support member 22 is used as a support of the neck A of the fowl.

The action of the second embodiment is as follows. The neck A of the fowl is placed on the upper surface of the support member 22 which is turned counter-clockwise either manually or automatically by the use of a motor in FIG. 4 so that the neck A attracted to the suction holes 24 of the support member 22 is turned clockwise in the drawing and only the meat is shaved off by the cutter blade 9 in the same way as in the first embodiment.

Figure 5:
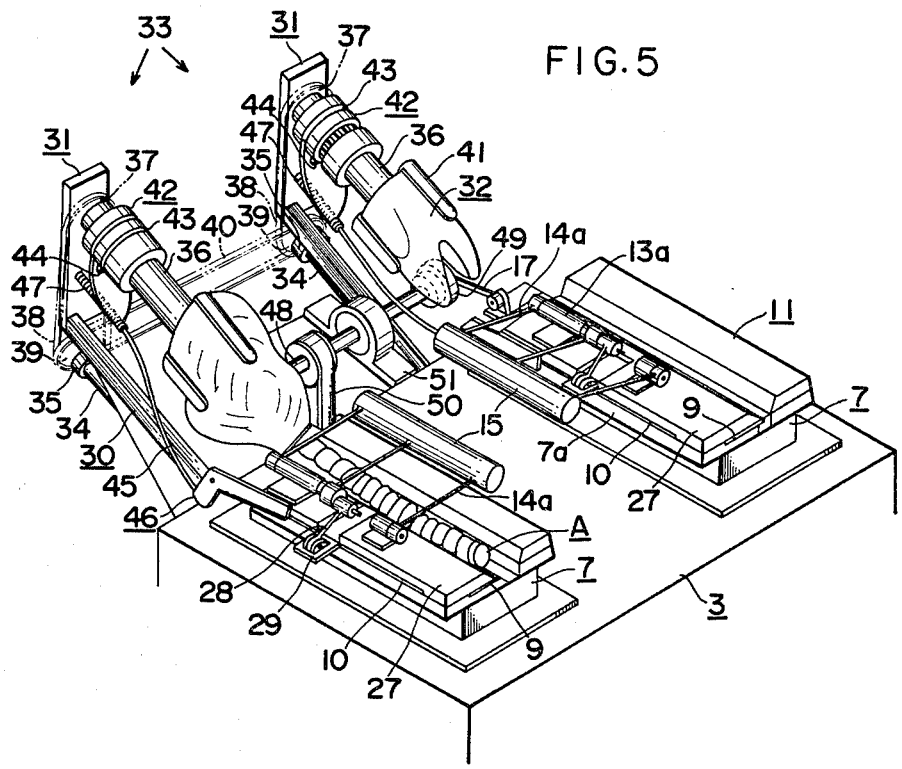
FIG. 5 is a perspective view of the third embodiment of the present invention.
Figure 6:
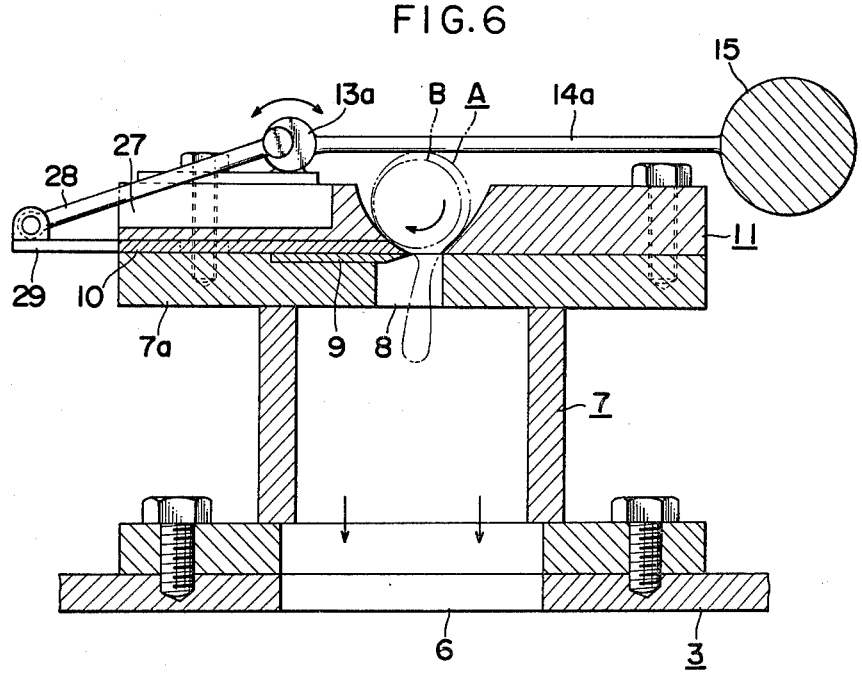
FIG. 6 is a sectional view of its principal portion.

Next, the third embodiment of the present invention will be explained by referring to FIGS. 5 and 6, wherein like reference numerals are used to identify like constituent elements as in the first embodiment and the explanation on these elements is deleted.

Two sets of the aforementioned supports 7 are placed in parallel with each other on the upper surface of the vacuum box 3 and the cutter blade 9 as the cutting blade, the support blade 10 and other members are fitted to each support 7.

When a plurality of the present devices are juxtaposed to the same suction source, the total open area of the suction holes 8 becomes greater so that the suction force for each device becomes inevitably insufficient. Accordingly, an operator is supposed to use alternately the two sets of the devices in this embodiment whereby the suction hole 8 of the device which is out of use is closed mechanically. Namely, whereas the support blade 10 of the first embodiment is secured to the support plate 7a so that its fitting position is adjustable, a guide plate 27 having a fitting groove on its lower surface is secured to the support plate 7a in this embodiment and the support blade 10 is fitted into the fitting groove so as to be able to retract to and from the suction hole 8. An arm 14a capable of opening and closing is fitted to a hinge member 13a on the upper surface of the guide plate 27 in order to press the neck A of the fowl to the support member 7. There is also disposed a mechanism which transfers the support blade 10 in synchronism with the opening/closing action of the arm 14a so as to open or close the suction hole 8. Namely, one end of a link 28 is turnably pivoted to the end surface of the hinge member 13a oppositely eccentrically with respect to the arm 14a and a small piece 29 is provided protrusively at the center on the rear end surface of the support blade 10. The other end of the link 28 is turnably pivoted to the rear end of this small piece 29.

A pair of support frames 30 and 31 are mounted to one side of vacuum box 3 to correspond to the two sets of supports 7 and a fowl fitting body 32 and drive mechanism 33 for turning this fitting body 32 are adapted to these support frames 30 and 31.

In the drive mechanism 33, a shaft 34 is turnably fitted to the support frame 30 via a bearing (not shown) and an endless chain 38 is wound around a sprocket at the outer end of the shaft 34 and a sprocket 37 of a rotary shaft 36 of the fowl fitting body 32. These shafts 34, 34 are mutually connected by an endless chain 40 that is wound around the respective sprockets 39, 39 to that when one of the shaft 34 is actuated either directly or indirectly by means of a motor (not shown) via a transmission member, both shafts 34, 34 are simultaneously rotated.

The fowl fitting body 32 is formed by a synthetic resin in the shape of the fowl to be processed and is arranged to incline toward the upper portion at one end of the support 7. Clips 41 are disposed on the outer surface of the fowl fitting body 32 so as to clamp the fowl between them.

A clutch 42 is inserted into the rotary shaft 36 of the fowl fitting body which is adapted to the support frame 31 and is allowed to perform the interrupted operation by means of its movement in the axial direction. a clutch actuator pawl 44 is engaged with an annular groove 43 of this clutch 42, said clutch actuator pawl 44 being turnably pivoted, via a coupling rod 45, to the rear end of a L-shaped plate 46 of which crank is turnably fitted to the support 7. The tip of this L-shaped plate 46 is capable of moving up and down on the rear end surface of the guide plate 27. When the arm 14a is opened, it engages with and pushed down the tip of this L-shaped plate 46. The clutch actuator pawl 44 is urged by a compression spring 47 fitted to the support frame 31 toward the fowl fitting body 32 so that the tip of the L-shaped plate 46 is constantly protruded upwardly from the upper surface of the guide plate 27.

Since this third embodiment uses two devices juxtaposed with each other, the rotary shaft 48 of the crank mechanism for reciprocating the cutter blade 9 is bridged over the two supports 7 and 7 and the rod 17 of each cutter blade 9 is coupled at an eccentric position of each disc 49 disposed on each end surface of the rotary shaft 48 by means of an eccentric pin. In the drawing, reference numeral 50 represents a V-belt for driving the rotary shaft 48 and reference numeral 51 does a bearing.

When both of two arms 14a are simultaneously opened and the two sets of support blades 10 close simultaneously the suction hole 8 during operation of the suction blower 2, an excessive load is applied to the suction blower 2 and its motor tends to be burned out.

To cope with this possible problem, the suction hole 8 is elongated in the axial direction in comparison with the support blade 10, though not shown in the drawing, so that the vacuum box 3 is not perfectly closed even when the two support blades 10 are closed.

The action of this third embodiment will now be explained.

After the arm 14a is opened, the neck A of the fowl is placed onto the suction hole 8 of the support 7 and the arm 14a is then closed to support the neck A of the fowl. At the same time, the support blade 10 is caused to move backward and the suction hole 8 is opened. Under this state the tip of the support blade 10 is positioned considerably more rearwardly than that of the cutter blade 9 in the same way as in the first embodiment. Under the state where the arm 14a is closed, the push-down force applied to the tip of the L-shaped plate 46 is released so that the clutch actuator pawl 44 is pushed toward the fowl fitting body 32 by the compression spring 47 and connects the clutch 42 whereby the turning force of the drive mechanism 33 is transmitted to the fowl fitting body 32. Thus, the fowl fitting body 32 starts rotating at an extremely low constant speed. The meat of the neck A of the fowl fitted to the fitting body 32 is then cut off by the cutter blade 9 reciprocating by means of the crank mechanism in the same way as in the first embodiment.

When one of the devices is in operation, the other is not used and its arm 14a is kept open. In synchronism with the opening action of this arm 14a the aforementioned opening/closing mechanism causes the support blade 10 to advance and the tip of the L-shaped plate 46 is pushed down by the arm 14a whereby the clutch actuator pawl 44 is pushed towards the support frame 31 via the coupling rod 45. Consequently, the clutch 42 of the other fowl fitting body 32 is cut off and its rotation stops.

What is claimed is:

1. A device for cutting meat from the neck of a fowl, said device comprising a machine frame, a suction blower mounted on said machine frame, vacuum chamber defining means connected with said suction blower so as to have its interior brought under vacuum by said suction blower, said vacuum chamber defining means having an elongated suction hole formed in the upper portion thereof communicating with its interior, an elongated cutting blade located adjacent said suction hole and having an elongated cutting edge extending generally parallel to the longitudinal axis of said suction hole, said cutting blade forming a gap between its cutting edge and said vacuum chamber defining means which gap is of substantially smaller width than the neck bone of a fowl neck to be processed whereby the meat from such neck may be drawn into said gap by the vacuum existing in said vacuum chamber means while said bone is precluded from entering said gap, a stationary support blade overlying said cutting blade and having an elongated edge spaced rearwardly a small distance from said cutting edge of said cutting blade, and means for reciprocating said cutting blade along the length of said suction hole.

2. A device for cutting off the meat from the neck of a fowl, said device comprising a machine frame, a suction blower mounted on said machine frame, a vacuum box mounted on said machine frame and connected with said suction blower so as to be brought under a vacuum by said blower, said vacuum box having an opening formed in its upper surface, a support plate mounted on said vacuum box and covering said opening in said upper surface thereof, said support plate having an elongated suction hole formed therein communicating with said opening, an elongated cutting blade extending along one side of said elongated suction hole and supported on said support plate for reciprocating movement along the length of said hole, said blade having an elongated cutting edge positioned above said suction hole between the longitudinal side edges of said hole, said cutting blade further forming a gap between its cutting edge and the opposite side edge of said suction hole which gap is of substantially smaller width than the neck bone of a fowl to be processed, a support blade overlying said cutting blade and attached to said support plate with a part of its undersurface in contact with the upper surface of the cutting blade, said support blade having an elongated edge spaced rearwardly a small distance from said cutting edge of said cutting blade, and means for reciprocating said cutting blade along the length of said suction hole.

3. A device as defined in claim 1 further characterized by said cutting edge of said cutting blade being positioned substantially midway between the side edges of said suction hole.

4. A device for cutting meat from the neck of a fowl, said device comprising a machine frame, a suction blower mounted on said machine frame, a vacuum pipe arranged horizontally and connected with said suction blower so as to have its interior brought under vacuum by said blower, said vacuum pipe having a first suction hole formed therein which suction hole is located substantially at the upper portion of said pipe and which suction hole is elongated in the direction parallel to the axis of said pipe and extends axially through the wall of said pipe to communicate with its interior, a cylindrical first support member rotatably fitted over said vacuum pipe and having a number of second suction holes formed therein and arranged so that for every angular position of said support member relative to said pipe some of said second suction holes communicate with said first suction hole of said pipe, a second support member arranged generally above and to one side of said cylindrical first support member in spaced relationship thereto, a cutting blade carried by said second support member and having an elongated cutting edge extending generally parallel to the axis of said pipe and positioned between said cylindrical first support member and said second support member, said cutting blade further forming a gap between its cutting edge and said cylindrical first support member which gap is of substantially smaller width than the neck bone of a fowl neck to be processed, a support blade attached to said second support member and overlying said cutting blade, said support blade having an undersurface a part of which engages the upper surface of said cutting blade, said support blade having an elongated edge spaced a small distance rearwardly from said cutting edge of said cutting blade, and means for reciprocating said cutting blade along an axis generally parallel to the axis of said pipe.

5. A device for cutting meat from the neck of a fowl, said device comprising a machine frame, a suction blower mounted on said machine frame, a vacuum box mounted on said machine frame and connected with said suction blower so as to be brought under suction by said blower, said vacuum box having an upper surface with an opening formed therein communicating with the interior thereof, a support plate mounted on said upper surface of said vacuum box and covering said opening, an elongated suction hole formed in said support plate, a cutting blade mounted on said support blade and supported for reciprocating movement along the length of said suction hole, said blade having a cutting edge positioned above said suction hole between the side edges of said hole, a support blade attached to said support plate in overlying relationship with said cutting blade and having an undersurface engaging the upper surface of said cutting blade, said support blade having an elongated edge spaced a small distance rearwardly from the cutting edge of said cutting blade, means for reciprocating said cutting blade along the length of said suction hole, a fowl fitting body arranged adjacent one end of said suction hole generally on a line extending from said suction hole in the longitudinal direction thereof for holding the body of a fowl while its neck is positioned over said suction hole, and means for rotating said fowl fitting body so as to rotate the neck of the fowl supported by said body relative to said suction hole.

6. A device for cutting meat from the neck of a fowl, said device comprising a machine frame, a suction blower mounted on said machine frame, a vacuum box mounted on said machine frame and connected with said suction blower so that the interior of said vacuum box is brought under vacuum by said suction blower, said vacuum box having an upper surface with two openings formed therein communicating with the interior thereof, two support plates mounted on the upper surface of said vacuum box and each disposed to cover a respective one of said two openings therein, each of said support plates having an elongated suction hole formed therein communicating with the associated one of said openings, a cutting blade associated with each of said support plates, said cutting blade being carried by its associated support plate and having an elongated cutting edge extending parallel to the associated suction hole and located between the side edges of said hole, a support blade movably carried by each of said support plates and having an undersurface engaged with the upper surface of the associated cutting blade and an edge generally parallel to the cutting edge of said associated cutting blade, means for reciprocating each of said cutting blades along the length of its associated suction hole, two fowl fitting bodies each associated with a respective one of said suction holes and each located adjacent one end of its associated suction hole generally on a line extending from that hole in the direction longitudinally thereof for holding the body of a fowl with the neck of such fowl overlying the associated suction hole, two rotary shafts each connected to a respective one of said fowl fitting bodies for rotating said bodies, means for rotating said two rotary shafts, two clutches each inserted between said rotating means and a respective one of said rotary shafts for drivingly connecting and disconnecting said rotary shafts from said rotating means, two arms each associated with a respective one of said two suction holes and each supported for movement between a closed position at which it presses a neck portion of a fowl toward its associated suction hole and an open position, means for connecting each of said clutches to an associated one of said arms so as to engage said clutch when the associated arm is in its closed position to cause rotation of the associated rotary shaft and fowl fitting body and so as to disengage said clutch when said associated arm is in said open position so as to stop rotation of the associated rotary shaft and fowl fitting body, and other means connected between each of said arms and the associated one of said support blades for moving said support blade in synchronism with the opening and closing movements of said arm so as to cause said support blade to substantially close the associated suction hole when said arm is open and to open said associated suction hole when said arm is closed.

* * * * *